United States Patent
Ma et al.

(10) Patent No.: US 10,662,348 B2
(45) Date of Patent: May 26, 2020

(54) ALUMINIUM-ZINC HOT-PLATED STEEL PLATE HAVING EXCELLENT WEATHER RESISTANCE, CORROSION RESISTANCE AND ALKALI RESISTANCE, AND MANUFACTURING METHOD AND SURFACE TREATING AGENT THEREFOR

(71) Applicant: BAOSHAN IRON & STEEL CO., LTD., Shanghai (CN)

(72) Inventors: Yuan Ma, Shanghai (CN); Yuling Ren, Shanghai (CN); Yigang Dai, Shanghai (CN); Jianping Zhang, Shanghai (CN); Lan Zhu, Shanghai (CN)

(73) Assignee: Baoshan Iron & Steel Co., Ltd., Shanghai (CA), n ( * ) Notice: Subject to any disclaimer, the term of this patent is extended or adjusted under 35 U.S.C. 154(b) by 0 days.

(21) Appl. No.: 14/647,194

(22) PCT Filed: Mar. 26, 2014

(86) PCT No.: PCT/CN2014/074096
§ 371 (c)(1),
(2) Date: May 26, 2015

(87) PCT Pub. No.: WO2014/190796
PCT Pub. Date: Dec. 4, 2014

(65) Prior Publication Data
US 2016/0068704 A1  Mar. 10, 2016

(30) Foreign Application Priority Data

May 27, 2013 (CN) .......................... 2013 1 0201955

(51) Int. Cl.
| C09D 175/04 | (2006.01) |
| C08L 75/04 | (2006.01) |
| C09D 5/08 | (2006.01) |
| C09D 175/06 | (2006.01) |
| C09D 7/40 | (2018.01) |
| B05D 3/00 | (2006.01) |
| B05D 5/00 | (2006.01) |
| B32B 15/18 | (2006.01) |
| B32B 15/095 | (2006.01) |
| C08G 18/44 | (2006.01) |
| C09D 5/00 | (2006.01) |

(52) U.S. Cl.
CPC .......... C09D 175/04 (2013.01); B05D 3/007 (2013.01); B05D 5/00 (2013.01); B32B 15/095 (2013.01); B32B 15/18 (2013.01); C08G 18/44 (2013.01); C08L 75/04 (2013.01); C09D 5/00 (2013.01); C09D 5/08 (2013.01); C09D 7/40 (2018.01); C09D 175/06 (2013.01)

(58) Field of Classification Search
CPC .... C09D 175/04; C09D 175/06; C09D 15/08; C09D 133/02; C09D 151/08; C09D 5/08–12; C09D 7/61; C08L 2205/02; C08L 75/06; C08L 75/16
See application file for complete search history.

(56) References Cited

U.S. PATENT DOCUMENTS

| 5,169,719 A * | 12/1992 | Balatan ............... C08F 290/067 427/427.5 |
| 6,562,474 B1 * | 5/2003 | Yoshimi ................... B05D 5/00 428/472.3 |
| 6,566,438 B1 * | 5/2003 | Ingrisch ............. C08G 18/0823 524/507 |
| 2004/0062873 A1 * | 4/2004 | Jung ........................ B05D 7/56 427/407.1 |
| 2006/0148980 A1 * | 7/2006 | Tielemans ......... C08G 18/0823 524/591 |
| 2006/0182988 A1 * | 8/2006 | Yamaji ..................... C09D 5/10 428/629 |
| 2009/0318596 A1 * | 12/2009 | Fu ...................... C08G 18/0823 524/232 |

(Continued)

FOREIGN PATENT DOCUMENTS

| CN | 1511908 A | 7/2004 |
| CN | 1528800 A * | 9/2004 |

(Continued)

OTHER PUBLICATIONS

Supplementary European Search Report and European Search Opinion in related Application No. EP 14 80 4953, dated Oct. 2016.*
TI-Pure R-706 Titanium Dioxide, Product Information, The Chemours Compoany, Jul. 2015.*
EPO machine translation of CN1528800A, published Sep. 2004.*
Machine translation of CN102746778 published Oct. 24, 2012. (Year: 2012).*

(Continued)

*Primary Examiner* — Monique R Jackson
(74) *Attorney, Agent, or Firm* — Quarles & Brady LLP

(57) ABSTRACT

Disclosed is an aluminium-zinc hot-plated steel plate having excellent weather resistance, corrosion resistance and alkali resistance, and an environmental-friendly surface treating agent therefor, wherein after the surface treatment of the aluminium-zinc hot-plated steel plate using an environmental-friendly surface treating agent consisting of the components of a matrix resin compounded from a particular solvent-free aqueous aliphatic polyurethane dispersion and aqueous polyurethane-acrylic acid copolymer, an organic silicon compound, a matrix resin curing agent, a water-soluble metal salt compound and a high-density polyethylene lubrication auxiliary etc., the formed surface-treated aluminium-zinc hot-plated steel plate has comprehensive properties of excellent weather resistance, corrosion resistance and alkali resistance, and good machine formability etc.

20 Claims, No Drawings

(56) References Cited

U.S. PATENT DOCUMENTS

| | | | | |
|---|---|---|---|---|
| 2010/0062200 A1* | 3/2010 | Domes | ................... | B05D 7/14 |
| | | | | 428/35.8 |
| 2015/0152287 A1* | 6/2015 | Flosbach | .............. | C08G 18/672 |
| | | | | 524/591 |

FOREIGN PATENT DOCUMENTS

| | | | | | |
|---|---|---|---|---|---|
| CN | 1530462 | A | | 9/2004 | |
| CN | 102632656 | A | | 8/2012 | |
| CN | 102746778 | A | | 10/2012 | |
| CN | 103254755 | A | | 8/2013 | |
| EP | 1433827 | A1 | * | 6/2004 | ........... C09D 175/04 |
| JP | 2007321224 | A | | 12/2007 | |
| KR | 100742909 | B1 | * | 7/2007 | |

OTHER PUBLICATIONS

PCT International Search Report, PCT/CN2014/074096, dated Jun. 17, 2014, 4 pages.

\* cited by examiner

ALUMINIUM-ZINC HOT-PLATED STEEL PLATE HAVING EXCELLENT WEATHER RESISTANCE, CORROSION RESISTANCE AND ALKALI RESISTANCE, AND MANUFACTURING METHOD AND SURFACE TREATING AGENT THEREFOR

CROSS-REFERENCE TO RELATED APPLICATIONS

This application represents the national stage entry of PCT International Application No. PCT/CN2014/074096 filed Mar. 26, 2014, which claims priority of Chinese Patent Application No. 201310201955.9 filed May 27, 2013, the disclosures of which are incorporated by reference here in their entirety for all purposes.

TECHNICAL FIELD

The present invention falls within the field of surface treatment of metal materials, and relates to an aluminium-zinc plated steel plate having excellent weather resistance, corrosion resistance and alkali resistance, and a manufacturing method and a surface treating agent therefor.

BACKGROUND ART

Since aluminium-zinc hot-plated steel plate has the features of good corrosion resistance, high heat reflectivity, heat resistance and ability for appearance decoration, it is widely used in various fields of the people's life, such as buildings, household appliances, automobiles etc., for example, a roof and wall surface of lightweight steel construction, a purlin, a floor support plate, a guardrail, a sound barrier and a drainage etc. in the building industry, and a back board of large-scale electric appliances and an automobile exhaust system etc. in the household appliance field. When particularly used as a building material, because of the need of guaranteeing a service life of more than ten years or even several decades, relatively strict requirements of the aluminium-zinc hot-plated steel plate are raised: for example, the material for a roof and wall surface needs to have good weather resistance and corrosion resistance, so as to ensure that the appearance surface of the steel plate during service has no colour change and corrosion, and the beautiful appearance is maintained for a long time; and when the material is used as a floor support plate, a guardrail, a sound barrier and a drainage etc., it is often in contact with slating and concrete etc. and thus exposed to an alkaline corrosion environment, in which case the material must be required to have good alkali resistance etc.

In order to meet the above-mentioned requirements and expectations, the surface of the aluminium-zinc hot-plated steel plate would usually be subjected to a wet film-coating treatment to enhance the resistance of the aluminium-zinc hot-plated steel plate to various corrosive media and environment, and currently the types of the surface treating agents used for the aluminium-zinc hot-plated steel plate can be roughly divided into two categories of chromium-containing treatment and chromium-free treatment. For the building industry, the corresponding environmental regulations have not been issued yet, and chromate has extremely strong corrosion resistance and self-repairing function, such that the aluminium-zinc hot-plated steel plate treated with the chromium-containing surface treatment becomes the mainstream in the building industry nowadays; however, with the development of the society, environmental protection requirements are increasingly strict, and the environmental protection of the building industry has been an irresistible trend; therefore, the aluminium-zinc hot-plated steel plate treated with the chromium-free surface treatment having various excellent resistances will be the mainstream in the future.

Japanese Patent JP 2007-321224 discloses an aluminium-zinc hot-plated steel plate having excellent corrosion resistance and water-resistant adherence, wherein the surface thereof is covered with a chromium-free treated organic/inorganic composite protection film, and the protection film consists of a silane-modified aqueous anionic resin, a tetravalent vanadium compound, and phosphoric acid or a compound thereof etc. The aluminium-zinc hot-plated steel plate coated with the protection film has excellent corrosion resistance and water-resistant adherence, but does not have adequate weather resistance and alkali resistance.

Chinese Patent CN 1530462 A provides a treating agent for metal surface and an aluminium-zinc plated steel plate treated with the treating agent, wherein the surface treating agent comprises an aqueous resin with combined carboxyl group and acid amide, such as a urethane resin or an acrylic resin, an organic silane coupling agent and one or two metal salt compounds, and the above-mentioned treating agent is coated onto the surface of the steel plate to form a single layer of skin film of 0.2-5 $g/m^2$. Although this patent provides a chromium-free coating film having good corrosion resistance and alkali resistance, the weather resistance thereof is not mentioned.

Chinese Patent CN 1511908 A provides an aqueous resin composition for treating a steel plate plated with an aluminium-zinc alloy, which comprises an anionic water-dispersed polyurethane resin, a silane coupling agent and a water-soluble zirconium compound etc., wherein the steel plate having an aluminium-zinc alloy surface to be treated with the treating agent has high processability, high corrosion resistance, weather resistance, resistance to blackening, and adhesion to a coating film, and this treating agent is also an environmental-friendly product; however, the evaluation time in this patent for the weather resistance is only 100 h, which is relatively short.

Chinese Patent CN 124777 A discloses an aluminium-zinc alloy steel plate coated with a resin composition, wherein a silane coupling agent having an amino group, chromium ions and an alcohol at least selected from one of a trihydric alcohol and a dihydric alcohol with 2-3 carbons are incorporated into an acrylic polymer resin emulsion containing a carboxyl group and a glycidyl group and having an acid value of 10-60, such that the resultant mixture has a pH of 7-9 so as to obtain the resin composition; and the resin composition is coated onto the aluminium-zinc alloy steel plate, and dried to form a resin skin film. The aluminium-zinc alloy steel plate coated with the resin composition has good formability, corrosion resistance, alkali resistance and coatability. However, the designed treating reagent therein is a chromium-containing product, and does not have an environmental protection performance, and the weather resistance thereof is not investigated.

CONTENTS OF THE INVENTION

An object of the present invention is to provide a surface-treated aluminium-zinc plated steel plate which is free of chromium and has excellent weather resistance, corrosion resistance and alkali resistance, and at the same time, the surface-treated aluminium-zinc plated steel plate also has certain properties such as machine forming.

Another object of the present invention is to provide an environmental-friendly aqueous surface treating agent which is capable of stably preparing the above-mentioned surface-treated aluminium-zinc plated steel plate.

In order to achieve the above-mentioned objects, the present invention uses the following technical solutions:

An aluminium-zinc hot-plated steel plate having excellent weather resistance, corrosion resistance and alkali resistance, wherein the surface thereof is covered with an environmental-friendly organic-inorganic composite protection film which contains:

(A) a complex matrix resin, the weight percentage thereof accounting for 50%-90% of the protection film;

(B) an organic silicon compound, the weight percentage thereof accounting for 2%-25% of the protection film;

(C) a matrix resin curing agent, the weight percentage thereof accounting for 1%-15% of the protection film;

(D) a metal salt compound, the weight percentage thereof based on the metal elements accounting for 0.1%-3% of the protection film;

(E) a water-soluble zirconium compound, the weight percentage thereof based on zirconia accounting for 1%-15% of the protection film; and (F) a lubrication auxiliary of high-density polyethylene particles or a lubrication auxiliary of polytetrafluoroethylene particles, the weight percentage thereof accounting for 0.4%-4% of the protection film.

Furthermore, said organic-inorganic composite protection film is a mono-layer structure, and the film thickness thereof ranges from 1 micron to 3 microns.

In the above-mentioned aluminium-zinc hot-plated steel plate having excellent weather resistance, corrosion resistance and alkali resistance:

Said complex matrix resin (A) is compounded from two anionic aqueous resins (A1) and (A2), wherein (A1) is a solvent-free aliphatic polyurethane resin based on polycarbonate diol which can be an aqueous solution and can also be of a water-dispersed type; (A2) is a copolymer of polyurethane-acrylic acid which can be an aqueous solution and can also be of a water-dispersed type; and the weight ratio of the anionic aqueous resins (A1) to (A2) is 1.0-15.0.

Said organic silicon compound (B) is selected from at least one of silicic acid, silicate, colloidal silica, and an organosilane coupling agent, and is preferably an organosilane coupling agent, and said organosilane coupling agent is for example selected from one or more of a vinyl silane coupling agent, an epoxy silane coupling agent, and a mercaptosilane coupling agent etc.

Said matrix resin curing agent (C) must be a compound having reactivity with the carboxyl group in the resin, which is for example selected from one or more of an epoxy compound having multiple functional groups, an organic titanium compound, an amino resin, a polycarbodiimide compound, and an aziridine compound etc.

Said metal salt compound (D) is a mixture of one or more compounds selected from the metal compounds of zinc, aluminium, magnesium, iron, vanadium, calcium, tungsten, nickel, manganese, cobalt, titanium and cerium. Vanadium compound or titanium compound is preferred.

Said water-soluble zirconium compound (E) is ammonium zirconium carbonate.

Both the high-density polyethylene particles and polytetrafluoroethylene particles in said lubrication auxiliary of high-density polyethylene particles or lubrication auxiliary of polytetrafluoroethylene particles (F) have a mean particle diameter of 0.5-2.0 microns.

An environmental-friendly aqueous surface treating agent for the aluminium-zinc plated steel plate, i.e. an surface treating agent for the aluminium-zinc plated steel plate having excellent weather resistance, corrosion resistance and alkali resistance, wherein the total solid parts in the aqueous solution thereof contains the following components:

(A) a complex matrix resin, the weight percentage thereof accounting for 50%-90% of the total solid parts;

(B) an organic silicon compound, the weight percentage thereof accounting for 2%-25% of the total solid parts;

(C) a matrix resin curing agent, the weight percentage thereof accounting for 1%-15% of the total solid parts;

(D) a metal salt compound, the weight percentage thereof based on the metal elements accounting for 0.1%-3% of the total solid parts;

(E) a water-soluble zirconium compound, the weight percentage thereof based on zirconia accounting for 1%-15% of the total solid parts; and (F) a lubrication auxiliary of high-density polyethylene particles or a lubrication auxiliary of polytetrafluoroethylene particles, the weight percentage thereof accounting for 0.4%-4% of the total solid parts;

The weight percentage of the water in said environmental-friendly aqueous surface treating agent for the aluminium-zinc plated steel plate is 70%-90%.

Said complex matrix resin (A) is compounded from two anionic aqueous resins (A1) and (A2), wherein (A1) is a solvent-free aliphatic polyurethane resin based on polycarbonate diol, such as, but not limited to, Acure6171 resin purchased from Shanghai Yuanhe Chemical Co., Ltd, which can be an aqueous solution and can also be of a water-dispersed type; (A2) is a copolymer of polyurethane-acrylic acid which can be an aqueous solution and can also be of a water-dispersed type; and the weight ratio of the anionic aqueous resins (A1) to (A2) is 1.0-15.0.

Said organic silicon compound (B) is selected from at least one of silicic acid, silicate, colloidal silica, and an organosilane coupling agent, and is preferably an organosilane coupling agent, and said organosilane coupling agent is for example selected from one or more of a vinyl silane coupling agent, an epoxy silane coupling agent, and a mercaptosilane coupling agent etc.

Said matrix resin curing agent (C) must be a compound having reactivity with the carboxyl group in the resin, which is for example selected from one or more of an epoxy compound having multiple functional groups, an organic titanium compound, an amino resin, a polycarbodiimide compound, and an aziridine compound etc.

Said metal salt compound (D) is a mixture of one or more compounds selected from the metal compounds of zinc, aluminium, magnesium, iron, vanadium, calcium, tungsten, nickel, manganese, cobalt, titanium and cerium. Vanadium compound or titanium compound is preferred.

Said water-soluble zirconium compound (E) is ammonium zirconium carbonate.

Both the high-density polyethylene particles and polytetrafluoroethylene particles in said lubrication auxiliary of high-density polyethylene particles or lubrication auxiliary of polytetrafluoroethylene particles (F) have a mean particle diameter of 0.5-2.0 microns.

The complex matrix resin (A) used in the present invention is compounded from two anionic aqueous resins (A1) and (A2), wherein (A1) is a solvent-free aliphatic polyurethane resin based on polycarbonate diol which can be an aqueous solution and can also be of a water-dispersed type; (A2) is a copolymer of polyurethane-acrylic acid which can be an aqueous solution and can also be of a water-dispersed type; the excellent resistances exhibited in the whole formulation system of the aqueous surface treating agent is inseparable from the complex matrix resin (A), wherein the excellent weather resistance and alkali resistance of (A1) and the excellent corrosion and adhesion properties of (A2) can be supplementary to each other, and function together on the whole formulation system; during the formulating process, (A1) and (A2) are first pre-mixed, the mixing temperature being 10° C.-50° C., and the mixing time being 5-30 min; if the temperature is excessively high and the time is excessively long, it may cause damage to the structure of the resin, and in turn influence the comprehensive resistances of the system, and if the temperature is excessively low and the time is excessively short, the reaction between the resins is not completed, and the optimum properties cannot be achieved; in addition, the weight ratio of the resins (A1) to (A2) is 1.0-15.0, if it is less than 1.0, the weather resistance of the skin film may decrease, and if it is more than 15.0, the processability of the skin film may become less favourable; furthermore, the weight ratio of the resins (A1) to (A2) is preferably 1.5-9.0. The weight percentage of the complex matrix resin (A) compounded from (A1) and (A2) accounting for the total solid parts in the aqueous solution is 50%-90%, if it is less than 50%, the weather resistance and corrosion resistance of the skin film may decrease, and if it is higher than 90%, the alkali resistance of the skin film may become less favourable; and the preferred weight percentage of the complex matrix resin (A) is 65%-85%.

The particular organic silicon compound (B) used in the present invention is preferably an organosilane coupling agent, and there is no special restriction, as long as it is a silane compound having multiple reaction functional groups, such as a vinyl silane coupling agent, an epoxy silane coupling agent, and a mercaptosilane coupling agent. The weight percentage of said organic silicon compound (B) accounting for the total solid parts in the aqueous solution is 2%-25%. If it is less than 2%, a sufficient adhesion to the substrate cannot be obtained, and the corrosion resistance may decrease; and if it is higher than 25%, the corrosion resistance and the stability of the treating solution become less favourable. The preferred weight percentage of the organic silicon compound (B) is 4%-15%.

To the particular matrix resin curing agent (C) used in the present invention, there is no specific restriction, as long as it is a compound having reactivity with the carboxyl group in the resin, and it is usually a commercial aqueous resin crosslinker, such as an epoxy compound having multiple functional groups, an organic titanium compound, an amino resin, a polycarbodiimide compound, and an aziridine compound. The weight percentage thereof accounting for the total solid parts in the aqueous solution is 1%-15%; if it is less than 1%, the crosslinking effect of the matrix resin curing agent (C) on the complex matrix resin (A) is not apparent, the degree of cure of the skin film is insufficient, and the decline in the corrosion resistance and weather resistance may occur; if it is higher than 15%, the matrix resin curing agent (C) reacts overly violently with the complex matrix resin (A), which tends to generate a gelation phenomenon and may result in a decrease in the stability of the treating agent. The preferred weight percentage of the matrix resin curing agent (C) is 2%-8%.

The metal salt compound (D) used in the present invention consists of one or more of the metal compounds of zinc, aluminium, magnesium, iron, vanadium, calcium, tungsten, nickel, manganese, cobalt, titanium and cerium, and is preferably vanadium compound or titanium compound. The valence state of vanadium in the vanadium compound can be any within the range of from +2 valence to +5 valence. The source of the vanadium compound can be an oxide, such as vanadium (V) oxide, and vanadium (III) oxide, and also can be a fluoride salt, such as vanadium (IV) fluoride and vanadium (V) fluoride. The titanium element in the titanium compound can be provided by a titanium compound containing fluorine. The weight percentage based on the metal elements of the metal salt compound accounting for the total solid parts in the aqueous solution is 0.1%-3%; when it is less than 0.1%, the corrosion resistance of the skin film may decrease; and when it is more than 3%, the adhesion of the skin film may become less favourable. The preferred weight percentage based on the metal elements of the metal salt compound (D) is 0.15%-1.5%.

The water-soluble zirconium compound (E) used in the present invention is ammonium zirconium carbonate, which can have an efficacy in corrosion inhibition in the organic-inorganic protection skin film, and can also further crosslink with the carboxyl group in the complex matrix resin (A), so as to improve the resistance properties and adhesion of the skin film. The weight percentage based on zirconia of the water-soluble zirconium compound (E) accounting for the total solid parts in the aqueous solution is 1%-15%; when it is less than 1%, the corrosion resistance and adhesion of the skin film become less favourable; and when it is higher than 15%, the stability of the surface treating agent becomes less favourable. The preferred weight percentage based on zirconia of the water-soluble zirconium compound (E) is 2%-8%.

The lubrication auxiliary of high-density polyethylene particles or lubrication auxiliary of polytetrafluoroethylene particles (F) used in the present invention is a commercial wax auxiliary, such as selected from a high-density polyethylene wax, and a mixed system of a polyethylene wax and a polytetrafluoroethylene wax; and the weight percentage of the lubrication auxiliary (F) accounting for the total solid parts in the aqueous solution is 0.4%-4%; if it is less than 0.4%, the lubricity is insufficient; and if it is more than 4%, the corrosion resistance and weather resistance of the skin film may decrease. The preferred weight percentage of the lubrication auxiliary (F) is 0.6%-2.5%. In addition, the average diameter of the particles in the lubrication auxiliary is within the range of 0.5-2 microns, less than 0.5 microns or higher than 2 microns would result in a decrease in the processability of the skin film, and the preferred diameter range of the particles is 0.7-1.5 microns.

One further object of the present invention is to provide a method for manufacturing the aluminium-zinc plated steel plate having excellent weather resistance, corrosion resistance and alkali resistance, comprising coating the above-mentioned environmental-friendly aqueous surface treating agent onto the surface of the aluminium-zinc plated steel plate in one pass of roller coating, drying between 80° C.-180° C., and allowing the dry film thickness of the protection film to be 1-3 microns, so as to obtain an aluminium-zinc plated steel plate with the surface thereof covered with an organic-inorganic composite protection film and having excellent weather resistance, corrosion resistance and alkali resistance.

In the method for manufacturing the aluminium-zinc plated steel plate having excellent weather resistance, corrosion resistance and alkali resistance provided in the present invention, the drying temperature of the aluminium-zinc plated steel plate should be preferably between 80° C.-180° C.; if it is less than 80° C., the crosslinking of the skin film is insufficient, which may cause various properties of the skin film to decrease; and if it is higher than 180° C., the properties of some components in the treating solution may change, which may influence the film-forming effect.

The dry film thickness obtained through coating the surface treating agent of the present invention onto the surface of the aluminium-zinc plated steel plate is between 1-3 microns, and if the skin film thickness is less than 1 micron, a decrease in the rolling processability, corrosion resistance, weather corrosion etc. may occur due to the relatively thin skin film; and if it exceeds 3 microns, the surface treating cost per unit area would increase.

The present invention has no specific restriction on the heating drying method of the aqueous surface treating agent coated on the surface of the aluminium-zinc plated steel plate, which can be a hot air heating, an induction heating, an infrared heating, etc. The present invention also has no specific restriction on the size and shape etc. of the aluminium-zinc plated steel plate.

Through researching in many ways in the present invention, the results show that after the surface treatment of the aluminium-zinc plated steel plate using an environmental-friendly surface treating agent consisting of the components of a matrix resin compounded from a particular solvent-free aqueous aliphatic polyurethane dispersion and an aqueous polyurethane-acrylic acid copolymer, a particular organic silicon compound, a particular matrix resin curing agent, a particular water-soluble metal salt compound and a high-density polyethylene lubrication auxiliary etc., the formed surface-treated aluminium-zinc plated steel plate has comprehensive properties of excellent weather resistance, corrosion resistance and alkali resistance, and good machine formability etc.

The present invention has the following beneficial effects compared with the prior art:

The surface-treated aluminium-zinc hot-plated steel plate of the present invention contains no chromium, has excellent weather resistance, corrosion resistance and alkali resistance, and at the same time has a good machine formability etc.; using the aqueous surface treating agent of the present invention can stably prepare the above-mentioned surface-treated aluminium-zinc hot-plated steel plate, and has a great practical effect in the aspects of environmental protection and reproducibility etc.

PARTICULAR EMBODIMENTS

The technical solutions of the present invention are further described in detail below in conjunction with the particular examples.

EXAMPLES

The following examples 1-10 and comparative examples 1-7 particularly describe an aluminium-zinc plated material used and a surface cleaning method therefor, an aqueous surface treating agent, a method for treating the aluminium-zinc plated steel plate, and the performance tests of the obtained surface-treated aluminium-zinc plated steel plate.

(I) Treating the Surface of the Aluminium-Zinc Plated Material:

1. Test sample plate: an aluminium-zinc hot-plated steel plate with a plate thickness of 0.5 mm, and the weight of the aluminium-zinc plated layer of 70/70 g/m².

2. Cleaning and manufacturing method for the aluminium-zinc plated steel plate:

The surface of the steel plate is first wiped using acetone or butanone, and then the steel plate is immersed into a 85% alcohol-water solution for 10 minutes ultrasonic cleaning, followed by cleaning with pure water and blow-drying. A surface treating agent is blade-coated onto the surface of the steel plate with a wire rod, and then the steel plate is dried under a condition of 80° C.-180° C., and ready for the performance test after cooling.

The composition of the aqueous surface treating agent: the composition of the surface treating agents used in examples 1-10 and comparative examples 1-7 is as shown in table 1.

The Materials Selected in the Present Examples (II) Manufacture of a Surface-Treated Aluminium-Zinc Hot-Plated Steel Plate:

Manufacture of the aluminium-zinc hot-plated steel plate having excellent weather resistance, corrosion resistance and alkali resistance in examples 1-10 comprises coating the corresponding environmental-friendly aqueous surface treating agent shown in the above-mentioned table 1 onto the surface of the aluminium-zinc plated steel plate in one pass of roller coating, drying at a temperature as shown in table 2, and allowing the dry film thickness to be as shown in table 2 (in micron), so as to obtain a corresponding aluminium-zinc plated steel plate with the surface thereof covered with an organic-inorganic composite protection film and having excellent weather resistance, corrosion resistance and alkali resistance. Comparative examples 1-7 also use the same method above for manufacturing a corresponding surface-treated aluminium-zinc plated steel plate, and the drying temperature and dry film thickness thereof are as shown in table 2.

TABLE 1

| | Complex matrix resin (A) | | | Organic silicon compound (B) | | Matrix resin curing agent (C) | | Metal salt compound (D) | | Water-soluble zirconium compound (E) | | Lubrication auxiliary (F) | |
|---|---|---|---|---|---|---|---|---|---|---|---|---|---|
| | Type | A1/A2 | The proportion of A | Type | The proportion of B | Type | The proportion of C | Type | The proportion of D | Type | The proportion of E | Type | The proportion of F |
| Example 1 | A1 + A2 | 2.3 | 79 | B1 | 11.6 | C1 | 3.9 | D1 | 0.2 | E | 3.1 | F1 | 2.2 |
| Example 2 | A1 + A2 | 2.3 | 80 | B2 | 12.0 | C1 | 4.0 | D1 | 0.2 | E | 1.6 | F1 | 2.2 |
| Example 3 | A1 + A2 | 1.9 | 83 | B1 | 8.3 | C1 | 3.3 | D1 | 0.3 | E | 4.2 | F1 | 0.9 |
| Example 4 | A1 + A2 | 4.0 | 83 | B1 | 8.3 | C1 | 3.3 | D1 | 0.3 | E | 4.2 | F1 | 0.9 |
| Example 5 | A1 + A2 | 3.0 | 82 | B1 | 8.2 | C2 | 4.0 | D2 | 0.2 | E | 4.0 | F2 | 1.6 |
| Example 6 | A1 + A2 | 9.0 | 85 | B2 | 4.3 | C1 | 3.4 | D1 | 0.3 | E | 6.0 | F2 | 1.0 |
| Example 7 | A1 + A2 | 1.5 | 89 | B2 | 4.3 | C1 | 3.2 | D2 | 0.2 | E | 2.7 | F1 | 0.6 |
| Example 8 | A1 + A2 | 4.0 | 67 | B2 | 15.0 | C1 | 7.5 | D2 | 1.5 | E | 5.0 | F1 | 4.0 |
| Example 9 | A1 + A2 | 4.0 | 83 | B4 | 8.3 | C1 | 3.3 | D1 | 0.3 | E | 4.2 | F1 | 0.9 |

TABLE 1-continued

|  | Complex matrix resin (A) | | | Organic silicon compound (B) | | Matrix resin curing agent (C) | | Metal salt compound (D) | | Water-soluble zirconium compound (E) | | Lubrication auxiliary (F) | |
| --- | --- | --- | --- | --- | --- | --- | --- | --- | --- | --- | --- | --- | --- |
|  | Type | A1/A2 | The proportion of A | Type | The proportion of B | Type | The proportion of C | Type | The proportion of D | Type | The proportion of E | Type | The proportion of F |
| Example 10 | A1 + A2 | 1.5 | 89 | B5 | 4.3 | C1 | 3.2 | D2 | 0.2 | E | 2.7 | F1 | 0.6 |
| Comparative Example 1 | A1 + A2 | 4.0 | 69 | B2 | 23.9 | C1 | 2.8 | D1 | 0.2 | E | 3.4 | F1 | 0.7 |
| Comparative Example 2 | A1 + A2 | 4.0 | 77 | B1 | 7.5 | C1 | 3.1 | D1 | 0.2 | E | 11.4 | F1 | 0.8 |
| Comparative Example 3 | A1 | — | 79 | B1 | 11.2 | C1 | 4.0 | D1 | 0.2 | E | 4.0 | F2 | 1.6 |
| Comparative Example 4 | A2 | — | 79 | B1 | 11.2 | C1 | 4.0 | D1 | 0.2 | E | 4.0 | F2 | 1.6 |
| Comparative Example 5 | A1 + A2 | 1.5 | 85 | B2 | 9.0 | C2 | 3.4 | — | — | E | 1.7 | F1 | 0.9 |
| Comparative Example 6 | A1 + A2 | 3.0 | 86 | B1 | 8.6 | C1 | 3.4 | D1 | 0.3 | — | — | F1 | 1.7 |
| Comparative Example 7 | A1 + A2 | 3.0 | 85 | B3 | 8.0 | C1 | 3.3 | D1 | 0.3 | E | 1.7 | F1 | 1.7 |

Note:
the proportion of A-F: the weight percentage of A-F in the solid parts of the treating agent;
A1/A2 represents the weight ratio of the two;
A1 is a solvent-free aqueous aliphatic anionic polyurethane resin based on polycarbonate diol, Acure6171 resin purchased from Shanghai Yuanhe Chemical Co., Ltd;
A2 is a copolymer of an anionic aqueous polyurethane-acrylic acid;
B1 is vinyl trimethoxysilane;
B2 is glycidoxypropyltrimethoxysilane;
B3 is aminopropyltriethoxysilane;
B4 is colloidal silica; and
B5 is potassium silicate;
C1 is polycarbodiimide; and
C2 is aziridine;
D1 is a V compound, in particular vanadium (pentavalence) oxide; and
D2 is a Ti compound, in particular ammonium fluorotitanate;
F1 is a high-density polyethylene wax;
F2 is a mixed system of a polyethylene wax and a polytetrafluoroethylene wax, the weight ratio thereof being 3:7.

(III) Performance Test of the Surface-Treated Aluminium-Zinc Hot-Plated Steel Plate:

The weather resistance, corrosion resistance, alkali resistance, processability and storage stability of the surface-treated aluminium-zinc hot-plated steel plate in examples 1-10 and comparative examples 1-7 are as shown in table 3:

1. Weather Resistance

A sample plate was placed in a UV aging test chamber (UVB-313 lamp tube), wherein the cycle period was set to be 8 h, with 4 h UV-irradiation at a black panel temperature of 60° C.±3° C., and 4 h condensation at a black panel temperature of 50° C.±3° C.; and after 600 h, the appearance of the sample plate was observed and the gloss retention rate thereof was measured, and the evaluation standard is as follows:

◎: the appearance of the sample plate has no significant change, and the gloss retention rate is more than or equal to 70%;

○: the appearance of the sample plate has a slight change, and the gloss retention rate is more than or equal to 50% and less than 70%;

Δ: the appearance of the sample plate has a remarkable change, and the gloss retention rate is more than or equal to 30% and less than 50%;

×: the appearance of the sample plate has a serious change, and the gloss retention rate is less than 30%.

2. Corrosion Resistance

A plane plate was subjected to a salt spray test, wherein the test standard is ASTM B 117, the test time was 240 hours, and the evaluation standard is as follows:

◎: the white rust area rate is less than or equal to 5%;
○: the white rust area rate is more than 5% and less than or equal to 10%;

Δ: the white rust area rate is more than 10% and less than or equal to 50%;

×: the white rust area rate is more than 50%.

3. Alkali Resistance

A test sample plate was immersed in a 0.1% sodium hydroxide solution for 1 hour, and taken out for blow-drying and then measured for the change in colour difference values (ΔE*) before and after immersing, and the evaluation standard is as follows:

◎: the colour difference value ΔE* is less than or equal to 3.0;

○: the colour difference value ΔE* is more than 3.0 and less than or equal to 6.0;

Δ: the colour difference value ΔE* is more than 6.0 and less than or equal to 9.0;

×: the colour difference value ΔE* is more than 9.0.

4. Processability 4.1 After performing a T-bend test on the test sample plate, a tape stripping method was used to evaluate the peeling degree of the processed skin film, and the evaluation standard is as follows:

◎: 2T, the skin film has no peeling;
○: 3T, the skin film has no peeling;
Δ: 4T, the skin film has no peeling;
×: 5T, the skin film has no peeling.

4.2 A draw-bead method was used for the test, and the test conditions were: a fixed pressure under bead of 3 KN, a pressure head diameter of 9.6 mm, and a drawing speed of 200 mm/min. The appearance was observed after drawing, and the evaluation method is as follows:

⊚: the appearance has no change;

○: a small amount of black points on the appearance;

Δ: relatively more obvious black stripes on the appearance;

×: the overall appearance becomes black.

5. Storage Stability

A treating solution was placed at room temperature, the change of the solution was observed after 90 days, and the evaluation method is as follows:

⊚: no change;

○: slightly thickening (functioning normally);

Δ: seriously thickening;

×: gel.

TABLE 2

The treating processes of each example and comparative example

|  | Thickness of the protection film (microns) | Drying temperature (° C.) |
|---|---|---|
| Example 1 | 1.2 | 120 |
| Example 2 | 1.4 | 90 |
| Example 3 | 1.5 | 130 |
| Example 4 | 1.8 | 130 |
| Example 5 | 2.0 | 120 |
| Example 6 | 2.1 | 120 |
| Example 7 | 2.3 | 120 |
| Example 8 | 2.8 | 160 |
| Example 9 | 1.8 | 130 |
| Example 10 | 2.3 | 120 |
| Comparative Example 1 | 0.8 | 80 |
| Comparative Example 2 | 1.2 | 120 |
| Comparative Example 3 | 1.2 | 120 |
| Comparative Example 4 | 1.6 | 130 |
| Comparative Example 5 | 1.9 | 130 |
| Comparative Example 6 | 2.3 | 120 |
| Comparative Example 7 | 2.7 | 120 |

TABLE 3

The performance of each example and comparative example

|  | Weather resistance | Corrosion resistance | Alkali resistance | Processability | | Storage stability |
|---|---|---|---|---|---|---|
|  |  |  |  | T bend | Drawing |  |
| Example 1 | ⊚ | ○ | ⊚ | ⊚ | ⊚ | ⊚ |
| Example 2 | ○ | ⊚ | ⊚ | ⊚ | ⊚ | ⊚ |
| Example 3 | ⊚ | ○ | ⊚ | ⊚ | ⊚ | ⊚ |
| Example 4 | ⊚ | ⊚ | ⊚ | ○ | ⊚ | ⊚ |
| Example 5 | ⊚ | ○ | ○ | ⊚ | ⊚ | ⊚ |
| Example 6 | ⊚ | ⊚ | ⊚ | ○ | ⊚ | ○ |
| Example 7 | ⊚ | ⊚ | ⊚ | ⊚ | ○ | ⊚ |
| Example 8 | ⊚ | ⊚ | ⊚ | ○ | ⊚ | ○ |
| Example 9 | ⊚ | ⊚ | ⊚ | ○ | ○ | ⊚ |
| Example 10 | ⊚ | ○ | ⊚ | ⊚ | ○ | ⊚ |
| Comparative Example 1 | ○ | Δ | Δ | ○ | ○ | Δ |
| Comparative Example 2 | ⊚ | Δ | ○ | ○ | ○ | × |
| Comparative Example 3 | ○ | Δ | ○ | Δ | ○ | ⊚ |
| Comparative Example 4 | Δ | ○ | Δ | ○ | ○ | ○ |
| Comparative Example 5 | ○ | × | Δ | ○ | ○ | ○ |
| Comparative Example 6 | Δ | Δ | ○ | ○ | ○ | ○ |
| Comparative Example 7 | ○ | ○ | ⊚ | ○ | ○ | × |

The performance effects of the surface-treated aluminium-zinc hot-plated steel plate of examples 1-10 and comparative examples 1-7 can be seen from table 2, wherein the excessive addition of the silane coupling agent in comparative example 1 causes the corrosion resistance, alkali resistance and solution stability to become less favourable; in comparative example 2, the excessive addition of the water-soluble zirconium compound results in a rapid decrease in the stability of the solution; in comparative examples 3 and 4, the matrix resin is not subjected to compounding, which respectively leads to a decrease in the weather resistance and the corrosion resistance; comparative examples 5 and 6 respectively lack the metal salt compound and the aqueous zirconium compound, which causes the weather resistance, corrosion resistance and alkali resistance to decrease to various degrees; and in comparative example 7, the amino silane coupling agent is used, and the stability of the solution becomes less favourable. However, the surface treating agent used for treating the surface of the aluminium-zinc hot-plated steel plate in examples 1-8 of the present invention is excellent in storage stability, and the aluminium-zinc hot-plated steel plate treated with this surface treating agent all shows good properties of weather resistance, corrosion resistance, alkali resistance and processability.

The surface-treated aluminium-zinc hot-plated steel plate of the present invention and the surface treating agent used therefor still have excellent weather resistance, corrosion resistance, alkali resistance, and processability etc. without containing chromium, which has a great practical effect in the social problems of environmental protection and reproducibility etc.

We claim:

1. An aluminium-zinc hot-plated steel plate having excellent weather resistance, corrosion resistance and alkali resistance, the plate comprising a surface comprising an environmental-friendly organic-inorganic composite protection film, the film comprising, based on the weight of the film:
   (A) 65-90 wt % complex matrix resin, wherein the complex matrix resin is compounded from two anionic aqueous resins (A1) and (A2), wherein anionic aqueous resin (A1) is a solvent-free aliphatic polyurethane resin based on polycarbonate diol, and anionic aqueous resin (A2) is a copolymer of polyurethane-acrylic acid and the anionic aqueous resin (A2) is not based on polycarbonate diol, wherein the weight ratio of the anionic aqueous resin (A1) to the anionic aqueous resin (A2) is 1.5-9.0;
   (B) 4-15 wt % organic or inorganic silicon compound selected from the group consisting of at least one of silicic acid, silicate, colloidal silica, and an organosilane coupling agent, wherein the organosilane coupling agent is selected from the group consisting of a vinyl silane coupling agent, an epoxy silane coupling agent, and a mercaptosilane coupling agent;

(C) 1-8 wt % matrix resin curing agent having reactivity with a carboxyl group in the complex matrix resin, selected from one or more of an epoxy compound having multiple functional groups, an organic titanium compound, an amino resin, a polycarbodiimide compound, and an aziridine compound;

(D) 0.1-3 wt % metal salt compound selected from one or more of metal compounds of zinc, aluminium, magnesium, iron, vanadium, calcium, tungsten, nickel, manganese, cobalt, titanium and cerium;

(E) 2-8 wt % water-soluble zirconium compound, wherein the weight percentage thereof is calculated based on zirconia; and (F) 0.4-4 wt % lubrication auxiliary of high-density polyethylene particles or a lubrication auxiliary of polytetrafluoroethylene particles.

2. The aluminium-zinc hot-plated steel plate of claim 1, wherein the organic-inorganic composite protection film is a mono-layer structure, and the film thickness thereof ranges from 1 micron to 3 microns.

3. The aluminium-zinc hot-plated steel plate of claim 1, wherein the organic silicon compound of (B) is selected from the group consisting of at least one of silicate, colloidal silica, and an organosilane coupling agent.

4. The aluminium-zinc hot-plated steel plate of claim 1, wherein the matrix resin curing agent of (C) is the polycarbodiimide compound or the aziridine compound.

5. The aluminium-zinc hot-plated steel plate of claim 1, wherein the metal salt compound of (D) is a metal compound of vanadium or titanium, or a mixture thereof.

6. The aluminium-zinc hot-plated steel plate of claim 5, wherein the metal salt compound of (D) is vanadium (V) oxide or ammonium fluorotitanate.

7. The aluminium-zinc hot-plated steel plate of claim 1, wherein the water-soluble zirconium compound of (E) is ammonium zirconium carbonate.

8. The aluminium-zinc hot-plated steel plate of claim 1, wherein both the high-density polyethylene particles and polytetrafluoroethylene particles in said lubrication auxiliary of high-density polyethylene particles or lubrication auxiliary of polytetrafluoroethylene particles of (F) have a mean particle diameter of 0.5-2.0 microns.

9. The aluminium-zinc hot-plated steel plate of claim 1, wherein the protection film comprises:
(A) 65-85 wt % said complex matrix resin;
(B) 4-15 wt % said organic or inorganic silicon compound selected from the group consisting of vinyl silane coupling agent, epoxy silane coupling agent, silicate and colloidal silica;
(C) 2-8 wt % said matrix resin curing agent selected from the group consisting of a polycarbodiimide compound, and an aziridine compound;
(D) 0.15-1.5 wt % said metal salt compound selected from the group consisting of vanadium (V) oxide and ammonium fluorotitanate;
(E) 2-8 wt % said water-soluble zirconium compound which is ammonium zirconium carbonate; and
(F) 0.6-2.5 wt % said lubrication auxiliary wherein both the high-density polyethylene particles and polytetrafluoroethylene particles have a mean particle diameter of 0.5-2.0 microns.

10. The aluminium-zinc hot-plated steel plate of claim 1, wherein the protection film comprises:
(A) 65-85 wt % said complex matrix resin;
(B) 4-15 wt % said organic silicon compound;
(C) 2-8 wt % said matrix resin curing agent;
(D) 0.15-1.5 wt % said metal salt compound;
(E) 2-8 wt % said water-soluble zirconium compound; and
(F) 0.6-2.5 wt % said lubrication auxiliary.

11. The aluminium-zinc hot-plated steel plate of claim 10, wherein the organic silicon compound of (B) is selected from the group consisting of at least one of silicate, colloidal silica, and an organosilane coupling agent selected from the group consisting of one or more of a vinyl silane coupling agent and an epoxy silane coupling agent.

12. The aluminium-zinc hot-plated steel plate of claim 10, wherein the matrix resin curing agent of (C) is the polycarbodiimide compound or the aziridine compound.

13. The aluminium-zinc hot-plated steel plate of claim 10, wherein the metal salt compound of (D) is vanadium (V) oxide or ammonium fluorotitanate.

14. The aluminium-zinc hot-plated steel plate of claim 10, wherein the water-soluble zirconium compound of (E) is ammonium zirconium carbonate.

15. The aluminium-zinc hot-plated steel plate of claim 10, wherein both the high-density polyethylene particles and polytetrafluoroethylene particles have a mean particle diameter of 0.5-2.0 microns.

16. An environmental-friendly aqueous surface treating agent for an aluminium-zinc hot-plated steel plate having excellent weather resistance, corrosion resistance and alkali resistance, wherein total solid parts in an aqueous solution thereof comprises, based on the weight of the solid parts:

(A) 65-90 wt % complex matrix resin, wherein the complex matrix resin is compounded from two anionic aqueous resins (A1) and (A2), wherein anionic aqueous resin (A1) is a solvent-free aliphatic polyurethane resin based on polycarbonate diol, and anionic aqueous resin (A2) is a copolymer of polyurethane-acrylic acid and the anionic aqueous resin (A2) is not based on polycarbonate diol, wherein the weight ratio of the anionic aqueous resin (A1) to the anionic aqueous resin (A2) is 1.5-9.0;

(B) 4-15 wt % organic or inorganic silicon compound selected from the group consisting of at least one of silicic acid, silicate, colloidal silica, and an organosilane coupling agent, wherein the organosilane coupling agent is selected from the group consisting of a vinyl silane coupling agent, an epoxy silane coupling agent, and a mercaptosilane coupling agent;

(C) 1%-8% matrix resin curing agent having reactivity with a carboxyl group in the complex matrix resin, selected from one or more of an epoxy compound having multiple functional groups, an organic titanium compound, an amino resin, a polycarbodiimide compound, and an aziridine compound;

(D) 0.1%-3% metal salt compound selected from one or more of metal compounds of zinc, aluminium, magnesium, iron, vanadium, calcium, tungsten, nickel, manganese, cobalt, titanium and cerium;

(E) 2-8 wt % water-soluble zirconium compound, wherein the weight percentage thereof is calculated based on zirconia;

(F) 0.4-4 wt % lubrication auxiliary of high-density polyethylene particles or a lubrication auxiliary of polytetrafluoroethylene particles; and wherein the aqueous surface treating agent comprises 70-90 wt % water, based on the total weight of the aqueous surface treating agent.

17. The environmental-friendly aqueous surface treating agent of claim 16, wherein the total solid parts in the aqueous solution thereof comprises:
- (A) 65%-85% said complex matrix resin;
- (B) 4-15 wt % said organic silicon compound;
- (C) 2-8 wt % said matrix resin curing agent;
- (D) 0.15-1.5 wt % said metal salt compound;
- (E) 2%-8% said water-soluble zirconium compound; and
- (F) 0.6-2.5 wt % said lubrication auxiliary.

18. The environmental-friendly aqueous surface treating agent of claim 16, wherein
- said organic or inorganic silicon compound of (B) is selected from the group consisting of at least one of silicate, colloidal silica, and an organosilane coupling agent;
- said matrix resin curing agent of (C) is the polycarbodiimide compound or the aziridine compound;
- said metal salt compound of (D) is a metal compound of vanadium or titanium, or a mixture thereof;
- said water-soluble zirconium compound of (E) is ammonium zirconium carbonate; and
- both the high-density polyethylene particles and polytetrafluoroethylene particles have a mean particle diameter of 0.5-2.0 microns.

19. The environmental-friendly aqueous surface treating agent of claim 16, wherein
- said organic silicon compound of (B) is selected from an organosilane coupling agent of one or more of a vinyl silane coupling agent, or an epoxy silane coupling agent; and
- said metal salt compound of (D) is vanadium (V) oxide or ammonium fluorotitanate.

20. A method for manufacturing an aluminium-zinc hot-plated steel plate having excellent weather resistance, corrosion resistance and alkali resistance, the method comprising
- a) coating the environmental-friendly aqueous surface treating agent of claim 16 onto at least a portion of an aluminium-zinc hot-plated steel plate in one pass of roller coating,
- b) drying the coated plate between 80° C.–180° C. until an organic-inorganic composite protection film of at least 1-3 microns is achieved,
- wherein an aluminium-zinc plated steel plate having excellent weather resistance, corrosion resistance and alkali resistance with a surface thereof covered with the organic-inorganic composite protection film is obtained.

* * * * *